United States Patent
Zhuang et al.

(10) Patent No.: US 9,034,107 B2
(45) Date of Patent: May 19, 2015

(54) PROCESS FOR MAKING A CONTINUOUS STRUCTURE OF AN ENCAPSULATED MATERIAL

(75) Inventors: Shuzhong Zhuang, Richmond, VA (US); Yi Zeng, Richmond, VA (US); Georgios D. Karles, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 972 days.

(21) Appl. No.: 13/071,570

(22) Filed: Mar. 25, 2011

(65) Prior Publication Data
US 2012/0037171 A1 Feb. 16, 2012

Related U.S. Application Data

(60) Provisional application No. 61/318,262, filed on Mar. 26, 2010.

(51) Int. Cl.
| | |
|---|---|
| *A23L 1/22* | (2006.01) |
| *A24D 1/00* | (2006.01) |
| *A24B 3/12* | (2006.01) |
| *A23P 1/04* | (2006.01) |

(52) U.S. Cl.
CPC ............ *A23L 1/22016* (2013.01); *A24D 1/002* (2013.01); *A24B 3/12* (2013.01); *A23P 1/04* (2013.01); *A23L 1/22058* (2013.01)

(58) Field of Classification Search
None
See application file for complete search history.

(56) References Cited

U.S. PATENT DOCUMENTS

| | | | |
|---|---|---|---|
| 4,333,484 A | 6/1982 | Keritsis | |
| 4,506,684 A | 3/1985 | Keritsis | |
| 4,966,171 A | 10/1990 | Serrano et al. | |
| 5,144,966 A * | 9/1992 | Washington | 131/335 |
| 5,221,502 A * | 6/1993 | Washington | 264/172.15 |
| 5,284,648 A * | 2/1994 | White et al. | 424/49 |
| 5,388,594 A | 2/1995 | Counts et al. | |
| 5,499,636 A | 3/1996 | Baggett, Jr. et al. | |
| 5,529,789 A * | 6/1996 | Lo | 424/473 |
| 5,531,735 A | 7/1996 | Thompson | |
| 5,650,116 A * | 7/1997 | Thompson | 264/561 |
| 5,666,976 A | 9/1997 | Adams et al. | |
| 5,692,525 A | 12/1997 | Counts et al. | |

(Continued)

OTHER PUBLICATIONS

International Preliminary Report on Patentability Issued Oct. 2, 2012 for PCT/IB2011/001134.

(Continued)

*Primary Examiner* — Benjamin Schiffman
(74) *Attorney, Agent, or Firm* — Buchanan Ingersoll & Rooney PC

(57) ABSTRACT

A method for providing an encapsulated flavorant or chemesthetic agent in a smoking article includes forming an emulsion including: (i) a first aqueous solution, comprising one or more cross-linkable polysaccharides; and (ii) a hydrophobic additive comprising one or more flavorants or chemesthetic agents. The method also includes extruding the emulsion into a second aqueous solution in the form of an elongated structure, cross-linking at least a portion of the one or more cross-linkable polysaccharides, removing the cross-linked elongated structure from the second aqueous solution, introducing the cross-linked elongated structure into a filter, or into a rod including a smoking composition, or both; and forming the filter or the rod of the smoking composition into a smoking article. The method can include a drying step.

22 Claims, 4 Drawing Sheets

(56) References Cited

U.S. PATENT DOCUMENTS

| | | |
|---|---|---|
| 5,692,526 A | 12/1997 | Adams et al. |
| 5,915,387 A | 6/1999 | Baggett, Jr. et al. |
| 5,988,176 A | 11/1999 | Baggett, Jr. et al. |
| 6,026,820 A | 2/2000 | Baggett, Jr. et al. |
| 7,866,325 B2 | 1/2011 | Woods |
| 8,119,175 B2 | 2/2012 | Soper et al. |
| 2006/0144412 A1 | 7/2006 | Mishra et al. |
| 2007/0000505 A1 | 1/2007 | Zhuang et al. |
| 2010/0294290 A1 | 11/2010 | Zhang |
| 2011/0232656 A1* | 9/2011 | Zeng et al. ............ 131/275 |

OTHER PUBLICATIONS

International Search Report and Written Opinion mailed Sep. 26, 2011 for PCT/IB2011/001134.

* cited by examiner

PROCESS FOR MAKING A CONTINUOUS STRUCTURE OF AN ENCAPSULATED MATERIAL

CROSS REFERENCE TO RELATED APPLICATION

This application claims priority under 35 U.S.C. §119(e) to U.S. Provisional Application No. 61/318,262, filed on Mar. 26, 2010, the entire content of which is incorporated herein by reference thereto.

SUMMARY

In one embodiment is disclosed, a method for providing an encapsulated flavorant or chemesthetic agent in a smoking article, which comprises: (a) forming an emulsion comprising: (i) a first aqueous solution, comprising one or more cross-linkable polysaccharides; and (ii) a hydrophobic additive comprising one or more flavorants or chemesthetic agents; (b) extruding said emulsion into a second aqueous solution in the form of an elongated structure, said second aqueous solution comprising one or more metal cations; (c) cross-linking at least a portion of said one or more cross-linkable polysaccharides, thereby forming a cross-linked elongated structure comprising cross-linked polysaccharide and said hydrophobic additive encapsulated therein; (d) removing said cross-linked elongated structure from said second aqueous solution; (e) introducing said cross-linked elongated structure into a filter, or into a rod comprising a smoking composition, or both; and (f) forming said filter or said rod of said smoking composition into a smoking article. In a particular embodiment, the method can also include drying the cross-linked elongated structure prior to placement in the filter or in the rod comprising a smoking composition.

In other embodiments are disclosed smoking articles produced by the methods described herein.

BRIEF DESCRIPTION OF THE DRAWING FIGURES

DETAILED DESCRIPTION

Figure 1:
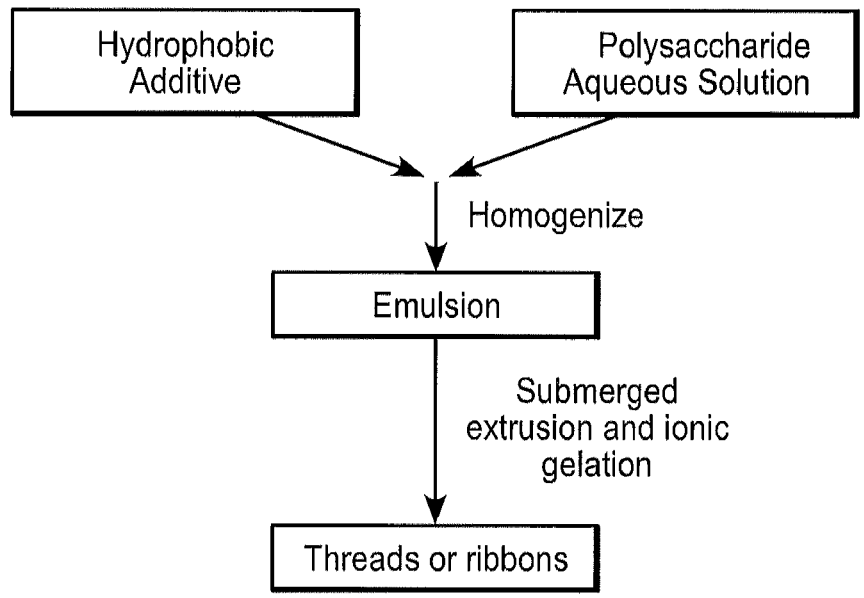
FIG. 1 is a flow chart illustrating one embodiment of a method of encapsulating an additive as described herein.

When additive materials, in particular, flavorants, such as menthol, or chemesthetic agents are incorporated into smoking articles, such as by incorporation into the rod of smoking composition in cigarettes, a premature release and migration of the additive can become problematic. Because the additive materials are often volatile, they can migrate and/or escape from the cigarette during manufacture or storage, so that when the smoker smokes the cigarette, the desired effect of the additive may be decreased. In order to attempt to compensate for this loss of additive, manufacturers often include more additive material in the cigarette, which adds to the cost thereof. In addition, in smoking articles that have filter systems containing sorbents, such as activated carbon, migration of additives to the sorbent, and sorption thereon, can both decrease the amount of additive available to the smoker, and result in a decreased level of sorption sites available for the removal of targeted constituents.

The method described herein, the encapsulated additives produced by this method, and smoking articles containing these encapsulated additives, attempt to minimize or reduce additive migration and its effects.

In one embodiment described herein, the method of encapsulating an additive involves producing one or more elongated structures within which one or more additives have been encapsulated. In a particular embodiment, these elongated structures can be in the form of threads, strands, ribbons, sheets, or combinations of these. In a particular embodiment, the elongated structure contains a matrix of one or more cross-linked polysaccharides, within which is encapsulated one or more additive materials.

More particularly, in one embodiment, the method of producing the elongated structure includes (a) forming an emulsion containing a first aqueous solution, which in turn contains one or more cross-linkable polysaccharides, and also containing an additive; (b) extruding said elongated structure of said emulsion into a second aqueous solution, said second aqueous solution comprising one or more metal cations; and (c) cross-linking at least a portion of said one or more cross-linkable polysaccharides, thereby forming a cross-linked elongated structure comprising cross-linked polysaccharide and additive encapsulated therein.

In a preferred embodiment, the method can optionally include drying of the cross-linked elongated structure. Preferably, the drying step includes air drying the cross-linked elongated structure for about 8 hours to about 16 hours, more particularly about 12 hours. Also preferably, the air drying occurs at ambient temperature. Alternatively, the cross-linked elongated structure can be dried in an oven. Preferably, the cross-linked elongated structure is air-dried prior to placement in a cigarette filter or in a rod containing a smoking composition.

As used herein, the term "smoking article" denotes any article that is generally consumed by burning or heating of a smoking composition, and includes articles wherein the smoking composition is heated but not combusted, to create heated vapors. It includes, but is not limited to, traditional cigarettes, cigars, cigarillos, pipes, electrically heated cigarettes, and the like. Preferred smoking articles are traditional cigarettes and electrically heated cigarettes.

As used herein, the term "traditional cigarette" denotes a cigarette that can be smoked by lighting an end of a wrapped rod of smoking composition and drawing air predominantly through the lit end by suction at a mouthpiece end of the cigarette. Traditional cigarettes can deliver smoke as a result of combustion of the smoking composition at temperatures that typically exceed about 800° C. during a puff. Combustion can release constituents that are drawn through the cigarette, and can cool and condense to form aerosols. These aerosols can provide the flavors and aromas associated with smoking. A preferred cigarette construction comprises a filter, composed of one or more pieces or plugs of filter material wrapped by a wrapper known as a plug wrap, which can typically be attached to one end of the rod of shredded smoking material (e.g., tobacco, also referred to as a "tobacco rod") by means of a wrapping or tipping material. Either the rod of smoking material or the wrapper therefore or both can be burned or heated during use of the smoking article under smoking conditions.

"Non-traditional cigarettes" can include, e.g., electrically heated cigarettes and/or fuel element heated cigarettes. As used herein, the term "electrically heated cigarette" denotes a cigarette specifically adapted for use in an electrical smoking system. Electrical smoking systems may include an electrically powered lighter and an electrically heated cigarette, which can be constructed to cooperate. with the lighter, and which preferably contains a rod or column of smoking composition. Electrical smoking systems generate only small amounts of sidestream smoke, and also permit consumers to suspend and reinitiate smoking as desired. Exemplary electrical smoking systems are described in U.S. Pat. Nos. 6,026,820; 5,988,176; 5,915,387; 5,692,526; 5,692,525; 5,666,976; 5,499,636; and 5,388,594, the entire content of each of which is incorporated herein by reference. Structures of other electrical "smoking" articles are possible and are included within the definition.

Other non-traditional cigarettes include those having a fuel element in the tobacco rod as described in U.S. Pat. No. 4,966,171, the entire content of which is incorporated herein by reference. It is desirable that non-traditional cigarettes, such as electrical smoking systems, be capable of delivering an aerosol or smoke in a manner similar to the consumer's experiences with traditional cigarettes, such as by providing an immediacy response (smoke delivery occurring immediately upon draw), a desired level of delivery (that correlates with FTC tar level), a desired resistance to draw (RTD), as well as puff-to-puff and cigarette-to-cigarette consistency.

As used herein, the term "smoking composition" is intended to include tobacco (i.e., cut filler, tobacco powder, etc.), tobacco substitute materials (i.e., vegetable or plant products like shredded lettuce) or a mixture of both. Specific examples of smoking compositions may include, but are not limited to, flue-cured tobacco, Burley tobacco, Maryland tobacco, Oriental tobacco, rare tobacco, specialty tobacco, reconstituted tobacco, genetically modified tobacco, and blends thereof. Smoking compositions can include these materials in any suitable form, including, but not limited to: lamina, such as tobacco lamina; processed materials, such as volume expanded or puffed tobacco; ground materials, such as ground tobacco; processed stems, such as cut-rolled or cut-puffed tobacco stems, reconstituted material, such as reconstituted tobacco; and blends thereof.

As used herein, the term "granular filtering material" denotes any particulate material used for, or capable of, removing targeted constituents from smoke by any mechanism, including size exclusion and/or sorption. The term is intended to include natural and/or manmade porous materials, such as rice or silica, as well as sorbents, such as activated carbon, activated alumina, and the like.

As used herein, the term "sorbent" denotes a material capable of sorption, i.e., adsorption, absorption, or other physical or chemical entrapment, or any combination of these, of substances, such as targeted constituents in main stream smoke. The term is intended to include materials capable of retaining targeted constituents through interactions on the outer surface of the material, as well as interactions within pores of the material, such as channels or cavities. In other words, a sorbent is a substance that has the ability to condense or hold molecules of other substances on its surface and/or the ability to take up other substances, e.g., through penetration of the other substances into its inner structure or pores. A sorbent can also function by physical sieving, e.g., by capturing substances in the pores. Examples include particulate materials, such as powdered or granulated activated carbon, activated alumina, or zeolite, as well as films or monolithic blocks containing sorbent materials.

As used herein, the "upstream" and "downstream" relative positions between filter segments and other features are described in relation to the direction of mainstream smoke as it is drawn from the tobacco rod and through the multi-component filter.

As used herein, the term "emulsion" denotes a stable mixture of two or more immiscible liquids held in suspension. An emulsion may, but need not, include added emulsifier.

As used herein, the term "aqueous solution" denotes a solution where the solvent contains, but need not be limited to, water.

As used herein, the term "cross-linkable polysaccharide" denotes a combination of monosaccharides linked together by glycosidic bonds, and capable of being cross-linked by an appropriate cross-linking agent. The term is intended to include polysaccharides such as pectins, alginates, and carageenans, which are cross-linkable by monovalent or polyvalent metal cations. Particularly suitable cross-linking metal cations include sodium ions, potassium ions, calcium ions, and aluminum ions.

As used herein, the term "additives" denotes a material included in a smoking article to modify one or more characteristics of the smoke obtained when a smokable composition is heated or combusted. The term is intended to include flavorants such as menthol and/or chemesthetic agents such as humectants, such as glycerol, glycerine, triethylene glycol, propylene glycol, and the like. In a particularly advantageous embodiment, the additive comprises a flavorant and/or chemesthetic agent. Menthol is a particularly preferred flavorant for encapsulation as described herein.

As used herein, the term "extruding" denotes a process whereby a liquid or gel, which may contain molten material, a solution, an emulsion, or a combination of these, is caused to flow through one or more orifices in a die.

As used herein, the term "elongated structure" denotes a solid, gel, or semisolid material having a length and a thickness, wherein the length is larger than the thickness. The term is intended to include threads, strands, ribbons, sheets, and the like.

As used herein, the term "metal cation" denotes a metal cation of a metallic element that is capable of cross-linking a cross-linkable polysaccharide. The term is intended to include monovalent and polyvalent metal cations, as well as cations that can take more than one valency. The term is particularly intended to include the cations of elements in Groups 1, 2, 8, 11, 12, and 13 of the Periodic Table, and particularly intended to include sodium, potassium, calcium, magnesium, and aluminum cations.

As used herein, the term "about" when used in conjunction with a numerical value or range of values for a particular parameter, indicates that it is permissible for the parameter to vary from the stated numerical value or range and still be considered to be within the scope thereof, to a maximum variation of ±10% of the stated value or range endpoint.

In one embodiment, the elongated structures described herein can be formed by following the process illustrated schematically in FIG. 1. The first step in that process is to mix an aqueous emulsion of a hydrophobic additive with a first aqueous solution of one or more cross-linkable polysaccharides. This mixture is formed into an emulsion in a homogenizer, e.g., by high speed stirring. The resulting emulsion is then extruded into a second aqueous solution containing one or more metal cations that are suitable to ionically gelate or crosslink at least one of the polysaccharides in the emulsion. The extrusion and cross-linking result in the formation of a thread or ribbon of crosslinked polysaccharide having the hydrophobic additive encapsulated therein.

Figure 2:
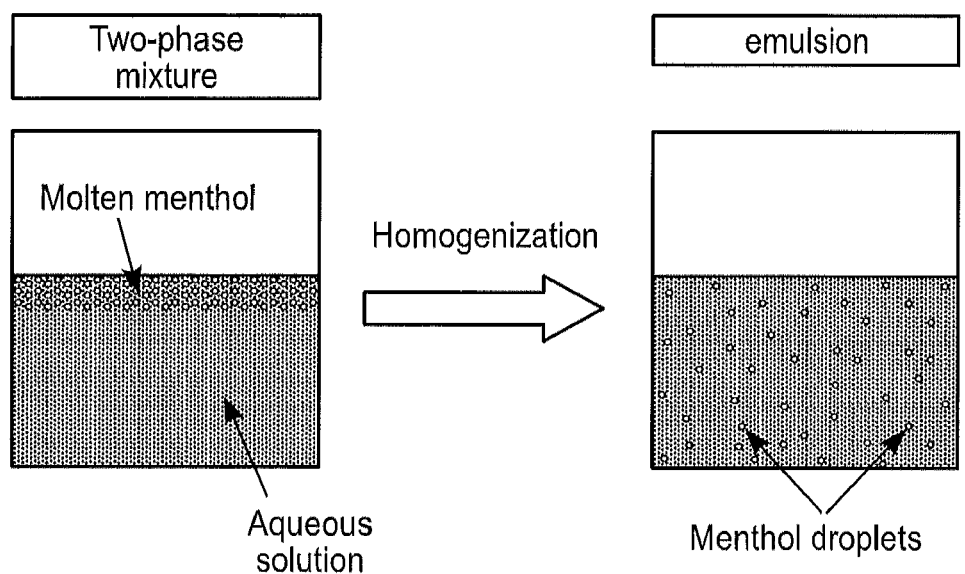
FIG. 2 is a schematic diagram illustrating one embodiment of forming an emulsion in an embodiment of the method of encapsulating an additive as described herein.

In a particular embodiment, the emulsion can be formed from a hydrophobic additive comprising menthol, and in particular, molten menthol as schematically illustrated in FIG. 2. As illustrated therein, a two-phase mixture of molten menthol and a first aqueous solution of at least one polysaccharide is subjected to homogenization to form an emulsion containing menthol droplets suspended in the aqueous solution. When this emulsion is extruded into a second aqueous solution containing one or more metal cations, the extrudate begins to crosslink, primarily at the surface at first. As the extrudate remains in the second aqueous solution, cations are transported into the interior of the extrudate, resulting in crosslinking there as well, and forming a network of crosslinked polysaccharide surrounding inclusions of the hydrophobic menthol.

Preferably, the wall thickness of the threads can be controlled by controlling the speed of cross-linking. For example, when using a very dilute calcium chloride solution for cross-linking, a thinner wall is formed because the cross-linking speed is slowed. Alternatively, a cross-linking solution including a larger amount of calcium ions results in faster cross-linking and a thicker wall. Additionally, the structure of the thread can be changed by varying the amounts of polymer used.

Preferably, the concentration range for the polysaccharide aqueous solution ranges from about 2% to about 7%. Also preferably, the concentration of cross-linking agent, e.g., calcium chloride, ranges from about 1% to about 10%. In a particular embodiment, an excessive amount of calcium chloride solution is used to ensure substantially complete cross-linking of polysaccharides.

Figure 3:
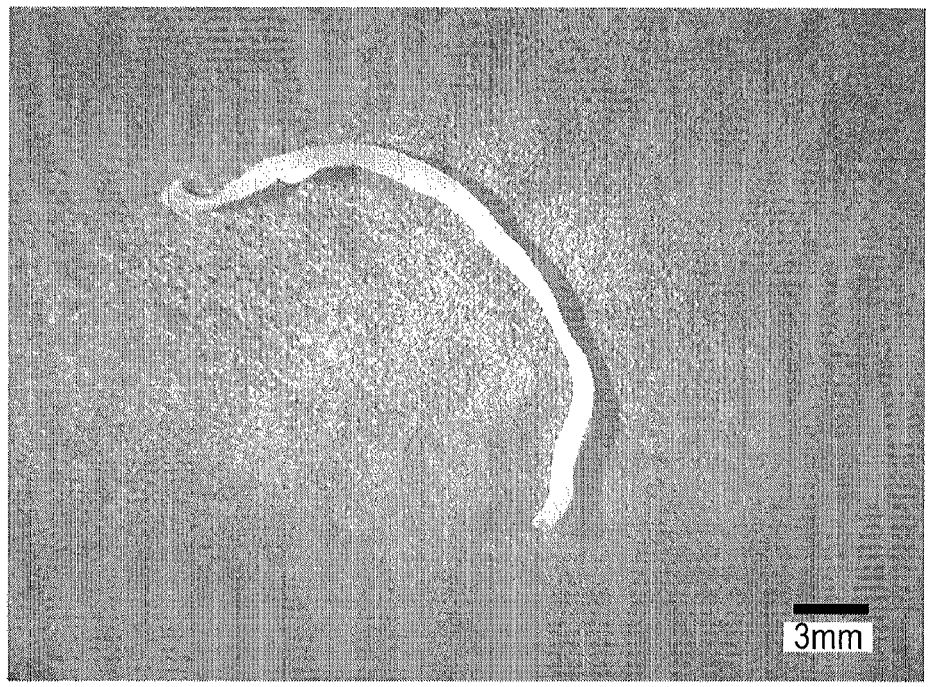
FIG. 3 is an optical microscopy image of an embodiment of an alginate menthol strand as described herein.
Figure 4:
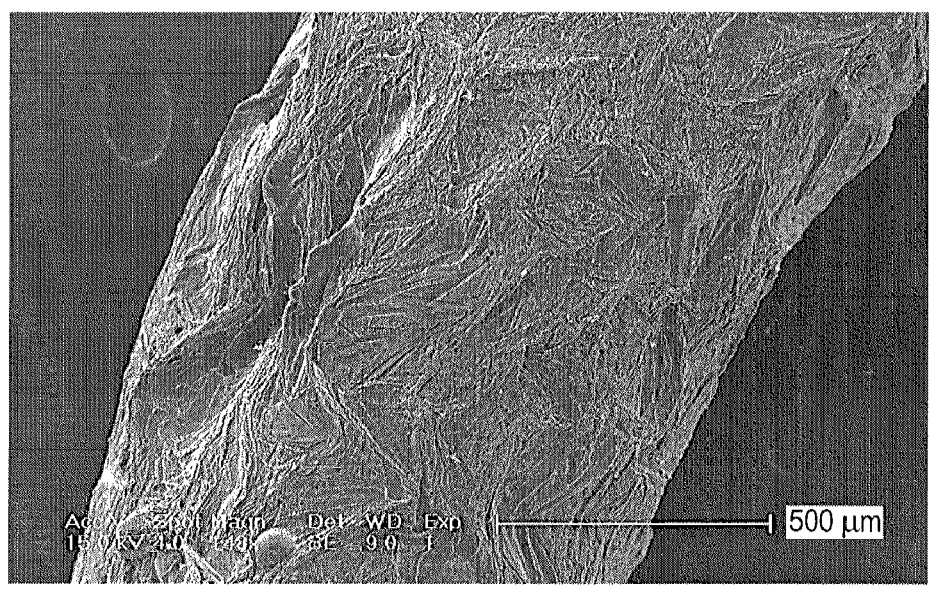
FIG. 4 is an SEM image of an embodiment of an alginate menthol strand as described herein.
Figure 5:
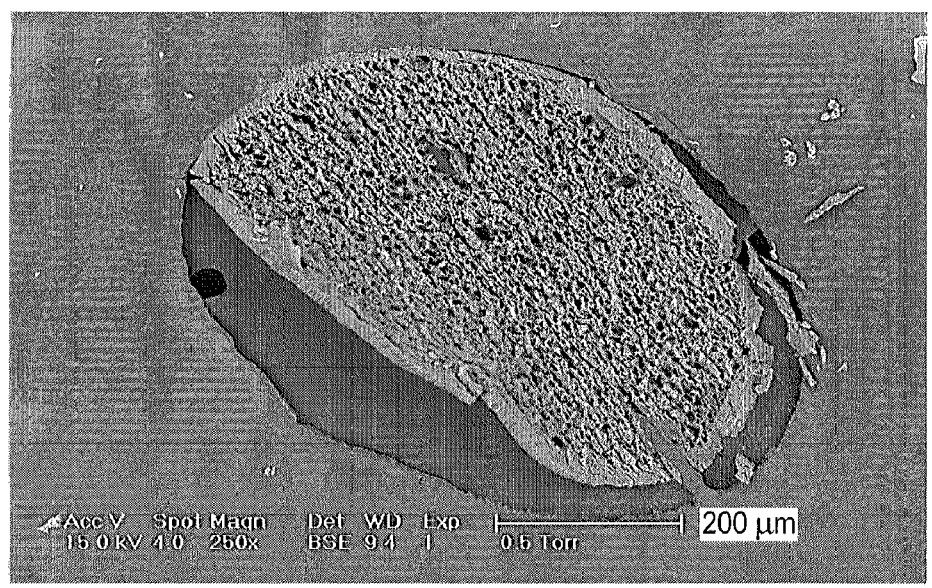
FIG. 5 is an SEM image of a cross-section of one embodiment of an alginate-menthol strand as described herein.

FIGS. 3 and 4 are scanning electron microscopy (SEM) images of an alginate-menthol thread. In a particular embodiment, the strand has an average diameter ranging from about 0.5 mm to about 1.5 mm and includes a solid shell having a wall thickness ranging from about 10 microns to about 50 microns, more preferably about 15 microns to about 20 microns. For example, the strand can have an average diameter of about 800 microns, consists of solid shells having a wall thickness ranging from about 15 microns to about 20 microns, and the internally random pore structures is surrounded by the solid shells as shown in the cross-sectional view of the thread of FIG. 5. The pores are formed because of the sublimation of menthol trapped inside the thread during the SEM sample preparation.

Figure 6:
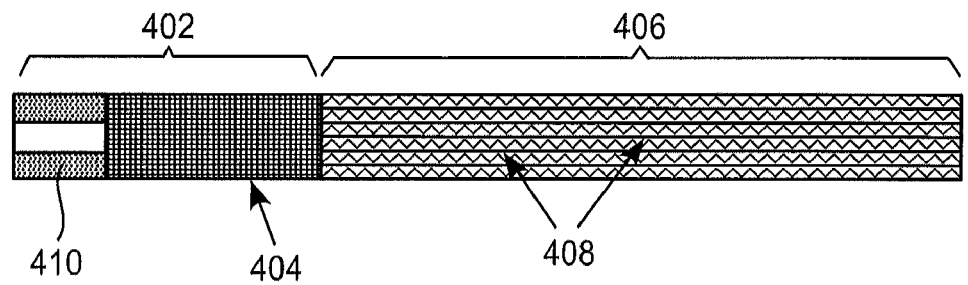
FIG. 6 is a schematic diagram illustrating a cross-sectional view of one embodiment of a smoking article containing threads of a cross-linked polysaccharide encapsulating an additive, as described herein.
Figure 7:
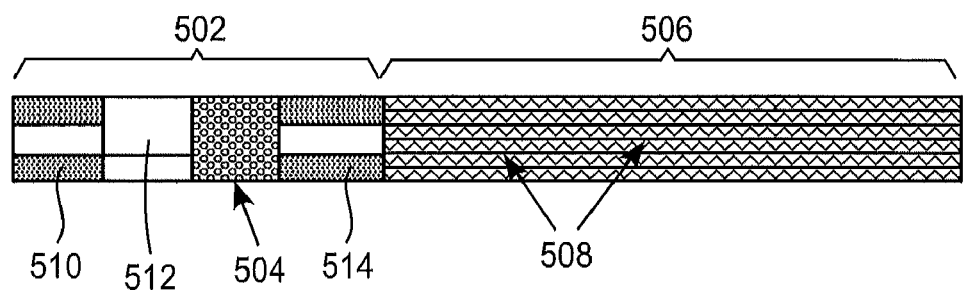
FIG. 7 is a schematic diagram illustrating a cross-sectional view of one embodiment of a smoking article containing threads of a cross-linked polysaccharide encapsulating an additive, as described herein.

Test cigarettes were prepared corresponding to those schematically illustrated in FIG. 6 and FIG. 7, and were evaluated for certain elements of their smoke chemistry, both before and after accelerated aging.

To form threads for the test cigarettes, about five parts of menthol crystals were added to 100 parts of aqueous alginate solution comprising about 5% sodium alginate and about 95% water. The mixture was heated to about 60° Celsius until the menthol was melted. The mixture was then processed to form an emulsion by high speed mixing in a homogenizer. The resulting emulsion was extruded through a 1.2 mm ID nozzle into a 5% calcium chloride solution via submerge extrusion to form a continuous thread. The thread was kept in the calcium chloride solution for about 30 minutes to ensure the crosslinking of alginate throughout the thread. The thread was rinsed with water about 3 times and laid on an absorbing towel to dry. The threads were then added to the tobacco rods in amounts indicated below.

Cigarette No. 1 corresponds to the cigarette 400 illustrated in FIG. 6, and contains a filter 402 containing 60 mg of carbon 404 and a cellulose acetate tip 410, and a tobacco rod 406 containing 40 mg of threads 408 of menthol encapsulated in pectin, produced as described herein.

Cigarette No. 2 corresponds to the cigarette 500 illustrated in FIG. 7, and contains 180 mg of activated carbon 504 disposed in a space in a "plug-space-plug" configuration, and a tobacco rod 506 containing 50 mg of the threads 508 of menthol encapsulated in pectin, produced as described herein. Cigarette filter 502 is tipped at the downstream end with a cellulose acetate plug 510, and contains another cellulose acetate plug 514 at the upstream end, where filter 502 is connected to tobacco rod 506. Another cellulose acetate plug 512 lies downstream of the activated carbon 504 and upstream of the cellulose acetate plug 510. Both cigarettes were subjected to an aging protocol lasting 14 days at 45° C., and the amount of targeted constituent reduction and menthol per cigarette were evaluated before and after aging. The results of this evaluation are provided below in Table 1.

In addition, cigarette Nos. 1 and 2 were evaluated for targeted constituent content per cigarette, puffs per cigarette, content of targeted constituent per puff, menthol in smoke, menthol per puff, and reduction of targeted constituent. These parameters were compared for those obtained for a standard mentholated cigarette without said menthol threads. The results of this evaluation are provided below in Table 2.

A panel evaluation of cigarette No. 1 with respect to certain preselected sensorial attributes was compared to those obtained for the control mentholated cigarette without menthol threads (the commercial "control" cigarette of Table 2). The results are based on approximately 25 evaluations by adult smokers aged 21 years or more. The panel rated the cigarette containing menthol encapsulated in pectin threads as similar to the control mentholated cigarette without threads with respect to certain attributes, with only a slightly lower perception of menthol, even when a carbon filter is present.

A panel evaluation of cigarette No. 1 with respect to certain preselected sensorial attributes was compared to those obtained for the control mentholated cigarette without menthol threads (the "control" cigarette of Table 2). The results are based on approximately 39 evaluations by adult smokers aged 21 years or more, and trained to perform quantitative evaluations of cigarettes. The results indicate that cigarette No. 1 provided an experience very similar to the control cigarette with respect to the sensory attributes. The only significant difference was with respect to resistance-to-draw.

A panel evaluation of cigarette No. 2 was compared with the standard mentholated cigarette without menthol threads (the "control" cigarette of Table 2). The results are based on approximately 39 evaluations by adult smokers aged 21 years or more, and trained to perform quantitative evaluations on cigarettes. Cigarette No. 2 had a similar tobacco taste to the control cigarette.

In this specification the words "generally" and "substantially" are sometimes used with respect to terms. When used with geometric terms, the words "generally" and "substantially" are intended to encompass not only features which meet the strict definitions but also features which fairly approximate the strict definitions.

While the foregoing describes in detail a preferred encapsulated material and methods of making the encapsulated material with reference to a specific embodiment thereof, it will be apparent to one skilled in the art that various changes and modifications may be made to the encapsulated material and equivalent methods may be employed, which do not materially depart from the spirit and scope of the foregoing description. Accordingly, all such changes, modifications, and equivalents that fall within the spirit and scope of the appended claims are intended to be encompassed thereby.

TABLE 1

| Cigarette | Estimated Menthol in Filler (mg) | Targeted Constituent Reduction (%) | | Menthol/ Cigarette (mg) | |
|---|---|---|---|---|---|
| | | Fresh | Aged | Fresh | Aged |
| 1 | 16 | 61 | 53 | 0.25 | 0.27 |
| 2 | 20 | 91 | 94 | 0.3 | 0.34 |

TABLE 2

| Cigarette | Tar (mg/cig) | Puffs/cig | Tar/puff (mg/puff) | Menthol in smoke (mg/cig) | Menthol/Puff (mg/puff) | Targeted Constituent Reduction (%) |
|---|---|---|---|---|---|---|
| Control | 5.6 | 8.1 | 0.69 | 0.51 | 0.06 | 0 |
| 1 | 6.9 | 8.4 | 0.82 | 0.25 | 0.03 | 64 |
| 2 | 4.6 | 8.0 | 0.58 | 0.30 | 0.04 | 91 |

What is claimed is:

1. A method for providing an encapsulated flavorant or chemesthetic agent in a smoking article, comprising:
    (a) forming a mixture comprising:
        (i) a first aqueous solution, comprising one or more cross-linkable polysaccharides; and
        (ii) a hydrophobic additive comprising one or more flavorants or chemesthetic agents;
    (b) heating the mixture until the hydrophobic additive is melted;
    (c) processing the mixture to form an emulsion;
    (d) extruding said emulsion into a second aqueous solution in the form of an elongated structure, said second aqueous solution comprising one or more metal cations;
    (e) cross-linking at least a portion of said one or more cross-linkable polysaccharides, thereby forming a cross-linked elongated structure comprising cross-linked polysaccharide and said hydrophobic additive encapsulated therein;
    (f) removing said cross-linked elongated structure from said second aqueous solution;
    (g) introducing said cross-linked elongated structure into a filter, or into a rod comprising a smoking composition, or both; and
    (h) forming said filter or said rod of said smoking composition into a smoking article.

2. The method of claim 1, further comprising washing said cross-linked elongated structure in an aqueous liquid to obtain a washed cross-linked elongated structure.

3. The method of claim 2, wherein the aqueous liquid is water.

4. The method of claim 2, further comprising removing the aqueous liquid from the washed cross-linked elongated structure to obtain a dried cross-linked elongated structure.

5. The method of claim 1, wherein said one or more cross-linkable polysaccharides is selected from the group consisting of pectins, alginates, carageenans, and combinations thereof.

6. The method of claim 1, wherein said one or more metal cations are selected from the group consisting of monovalent metal cations, divalent metal cations, and trivalent metal cations.

7. The method of claim 6, wherein said monovalent metal cations comprise potassium cations, said divalent metal cations comprise calcium cations, and said trivalent metal cations comprise aluminum cations.

8. The method of claim 1, wherein said cross-linked elongated structure is selected from the group consisting of threads, strands, ribbons, and sheets.

9. The method of claim 1, wherein said forming of said emulsion comprises homogenizing a mixture of said aqueous solution and said hydrophobic additive in a homogenizer.

10. The method of claim 1, wherein said emulsion further comprises one or more emulsifying agents.

11. The method of claim 8, wherein said elongated structure is a strand having an average diameter of about 0.5 mm to about 1.5 mm.

12. The method of claim 11, wherein said strand comprises a solid shell surrounding an interior comprising said additive.

13. The method of claim 12, wherein said solid shell has a thickness ranging between about 10 μm and about 50 μm.

14. The method of claim 1, wherein said one or more flavorants or chemesthetic agents comprise menthol.

15. The method of claim 14, wherein said menthol comprises molten menthol.

16. The method of claim 1, wherein said hydrophobic additive comprises a solution or suspension of one or more flavorants or chemesthetic agents in an oil solution or organic solvent.

17. The method of claim 1, wherein said extruding comprises causing said emulsion to flow through one or more orifices disposed at or adjacent to a surface of said second aqueous solution.

18. The method of claim 17, wherein said one or more orifices are disposed at or beneath said surface.

19. The method of claim 1, further including drying said cross-linked elongated structure.

20. The method of claim 19, wherein the drying step includes air-drying said cross-linked elongated structure for about 8 hours to about 16 hours.

21. A method for providing an encapsulated flavorant or chemesthetic agent comprising:
    (a) forming a mixture comprising:
        (i) a first aqueous solution, comprising one or more cross-linkable polysaccharides; and
        (ii) a hydrophobic additive comprising one or more flavorants or chemesthetic agents;
    (b) heating the mixture until the hydrophobic additive is melted;
    (c) processing the mixture to form an emulsion;
    (d) submerge extruding said emulsion into a second aqueous solution in the form of an elongated structure, said second aqueous solution comprising one or more metal cations;

(e) cross-linking at least a portion of said one or more cross-linkable polysaccharides, thereby forming a cross-linked elongated structure comprising cross-linked polysaccharide and said hydrophobic additive encapsulated therein; and
(f) removing said cross-linked elongated structure from said second aqueous solution.

22. The method of claim 1, wherein the hydrophobic additive comprises menthol crystals and the heating step comprises heating the mixture to a temperature of about 60° C.

* * * * *